US007614049B2

(12) United States Patent
Chalasani et al.

(10) Patent No.: US 7,614,049 B2
(45) Date of Patent: Nov. 3, 2009

(54) AUTONOMIC INSTALLATION AND CONFIGURATION OF AN ENTERPRISE BUSINESS PROCESS ON-DEMAND

(75) Inventors: Nanchariah R. Chalasani, Fairfax, VA (US); Mandar U. Jog, Raleigh, NC (US); Neeraj Joshi, Morrisville, NC (US); Balan Subramanian, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 612 days.

(21) Appl. No.: 10/924,602

(22) Filed: Aug. 24, 2004

(65) Prior Publication Data

US 2006/0059029 A1 Mar. 16, 2006

(51) Int. Cl.
*G06F 9/445* (2006.01)
(52) U.S. Cl. ...................................................... 717/174
(58) Field of Classification Search .......... 717/168–178
See application file for complete search history.

(56) References Cited

U.S. PATENT DOCUMENTS

| | | | |
|---|---|---|---|
| 5,848,426 A | 12/1998 | Wang et al. | |
| 5,859,977 A | 1/1999 | Nishiyama et al. | |
| 5,867,824 A * | 2/1999 | Saito et al. | 705/9 |
| 5,930,512 A * | 7/1999 | Boden et al. | 717/102 |
| 6,112,301 A | 8/2000 | Johnson | |
| 6,389,588 B1 | 5/2002 | Wadhwa et al. | |
| 6,418,554 B1 | 7/2002 | Delo et al. | |
| 6,523,166 B1 | 2/2003 | Mishra et al. | |
| 6,571,246 B1 * | 5/2003 | Anderson et al. | 707/10 |
| 6,609,099 B1 | 8/2003 | Matsuzaki | |
| 6,671,875 B1 | 12/2003 | Lindsey et al. | |
| 6,820,118 B1 * | 11/2004 | Leymann et al. | 709/223 |
| 7,222,302 B2 * | 5/2007 | Hauser et al. | 715/734 |
| 2002/0091560 A1 * | 7/2002 | Suzuki et al. | 705/9 |
| 2004/0034552 A1 * | 2/2004 | Cole et al. | 705/7 |
| 2004/0034553 A1 * | 2/2004 | Cole et al. | 705/7 |

(Continued)

FOREIGN PATENT DOCUMENTS

EP 1 381 186 A1 1/2004

(Continued)

OTHER PUBLICATIONS

Swenson et al., "Workflow Technology: Tradeoffs for Business Process Re-engineering," 1995, ACM, p. 22-29.*

(Continued)

*Primary Examiner*—Wei Y Zhen
*Assistant Examiner*—Qing Chen
(74) *Attorney, Agent, or Firm*—Hoffman Warnick LLC (57) ABSTRACT

The present invention provides a method, system, and computer program product for the autonomic installation and configuration of an enterprise business process on-demand. The method comprises: providing a business process document for expressing the business process, wherein the business process comprises a plurality of components and a workflow; providing a plurality of installation documents, where each installation document describes an installation of a component of the business process; providing a mapping document for mapping each component of the business process to at least one of the installation documents describing the installation of that component; and provisioning the business process on-demand using the business process document, the installation documents, and the mapping document.

12 Claims, 4 Drawing Sheets

U.S. PATENT DOCUMENTS

2004/0060035 A1\* 3/2004 Ustaris ................. 717/100
2004/0162741 A1\* 8/2004 Flaxer et al. ............... 705/7
2004/0230681 A1\* 11/2004 Strassner et al. ........... 709/226
2004/0254945 A1\* 12/2004 Schmidt et al. ............ 707/100

FOREIGN PATENT DOCUMENTS

WO    WO 03/107179 A1    12/2003

OTHER PUBLICATIONS

Bohrer et al., "Business process components for distributed object applications," 1998, ACM, p. 43-48.\*

Bahrami et al., "Enterprise architecture for business process simulation," 1998, IEEE, p. 1409-1413.\*

"Installable Unit Deployment Descriptor Specification Version 1.0," Jun. 2004, W3C <http://www.w3.org/Submission/InstallableUnit-DD/InstallableUnit-DD.pdf>, p. 1-12 and 55-57.\*

Bell et al., "Registration of LOB Applications with Officevision/2", IBM Technical Disclosure Bulletin, vol. 33, No. 10A, Mar. 1991, p. 316.

Miller, "Automatic System Customizer Configurator", IBM Technical Disclosure Bulletin, vol. 16, No. 7, Dec. 1973, pp. 2115-2120.

"IBM Standard Sofware Installer (ISSI)", IBM Research Disclosure, Nov. 2000.

\* cited by examiner

AUTONOMIC INSTALLATION AND CONFIGURATION OF AN ENTERPRISE BUSINESS PROCESS ON-DEMAND

BACKGROUND OF THE INVENTION

1. Field of the Invention

The present invention generally relates to the provisioning of a business process. More particularly, the present invention provides a method, system, and computer program product for the autonomic installation and configuration of an enterprise business process on-demand.

2. Related Art

An on-demand strategy for an enterprise business process encompasses dynamic provisioning and dynamic change management. Provisioning a business process typically involves provisioning databases, application servers, and enterprise applications along with support applications and services. Provisioning a business process also involves configuring different components to enable business flow between the components.

With the advent of the Business Process Execution Language (BPEL), which provides a method for expressing a business process, enterprises can now describe a business process in the form of an executable BPEL document. Unfortunately, the BPEL document leaves out the actual low level details of how the particular components of the BPEL document are provisioned; it does not provide a method to actually provision the business process defined in the BPEL document.

In view of the foregoing, there exists a need for a method, system, and computer program product for provisioning a business process defined in a BPEL document that obviates the current disconnect between a business process expressed as a BPEL document and its provisioning infrastructure.

SUMMARY OF THE INVENTION

In general, the present invention provides a method, system, and computer program product for the autonomic installation and configuration of an enterprise business process on-demand. In particular, a meta-language mapping document is used by a BPEL controller to map the components of a business process described in a BPEL document to Solution Module Definition (SMD) documents describing the installation of the individual components of the business process. Thus, SMD documents are used to provision the components of a business process described in a BPEL document on-demand.

A first aspect of the present invention is directed to a method for installing and configuring a business process on-demand, comprising: providing a business process document for expressing the business process, wherein the business process comprises a plurality of components and a workflow; providing a plurality of installation documents, where each installation document describes an installation of a component of the business process; providing a mapping document for mapping each component of the business process to at least one of the installation documents describing the installation of that component; and provisioning the business process on-demand using the business process document, the installation documents, and the mapping document.

A second aspect of the present invention is directed to a method for installing and configuring a business process, comprising: providing a Business Process Execution Language (BPEL) document for expressing the business process, wherein the business process comprises a plurality of components and a workflow; providing a plurality of Solution Module Definition (SMD) documents, where each SMD document describes an installation of a component of the business process; and mapping each component of the business process expressed in the BPEL document to at least one of the SMD documents describing the installation of that component using a mapping document.

A third aspect of the present invention is directed to a system for installing and configuring a business process on-demand, comprising: a business process document for expressing the business process, wherein the business process comprises a plurality of components and a workflow; a plurality of installation documents, where each installation document describes an installation of a component of the business process; a mapping document for mapping each component of the business process to at least one of the installation documents describing the installation of that component; and a system for provisioning the business process on-demand using the business process document, the installation documents, and the mapping document.

A fourth aspect of the present invention is directed to a system for installing and configuring a business process, comprising: a Business Process Execution Language (BPEL) document for expressing the business process, wherein the business process comprises a plurality of components and a workflow; a plurality of Solution Module Definition (SMD) documents, where each SMD document describes an installation of a component of the business process; and a mapping document for mapping each component of the business process expressed in the BPEL document to at least one of the SMD documents describing the installation of that component.

A fifth aspect of the present invention is directed to a program product stored on a recordable medium for installing and configuring a business process on-demand, which when executed comprises: program code for providing a business process document for expressing the business process, wherein the business process comprises a plurality of components and a workflow; program code for providing a plurality of installation documents, where each installation document describes an installation of a component of the business process; program code for providing a mapping document for mapping each component of the business process to at least one of the installation documents describing the installation of that component; and program code for provisioning the business process on-demand using the business process document, the installation documents, and the mapping document.

A sixth aspect of the present invention is directed to a program product stored on a recordable medium for installing and configuring a business process, which when executed comprises: program code for providing a Business Process Execution Language (BPEL) document for expressing the business process, wherein the business process comprises a plurality of components and a workflow; program code for providing a plurality of Solution Module Definition (SMD) documents, where each SMD document describes an installation of a component of the business process; and program code for mapping each component of the business process expressed in the BPEL document to at least one of the SMD documents describing the installation of that component using a mapping document.

A seventh aspect of the present invention is directed to a system for deploying an application for installing and configuring a business process on-demand, comprising: a computer infrastructure being operable to: provide a business process document for expressing the business process, wherein the business process comprises a plurality of components and a workflow; provide a plurality of installation documents, where each installation document describes an installation of a component of the business process; provide a mapping document for mapping each component of the business process to at least one of the installation documents describing the installation of that component; and provision the business process on-demand using the business process document, the installation documents, and the mapping document.

An eighth aspect of the present invention is directed to computer software embodied in a propagated signal for installing and configuring a business process on-demand, the computer software comprising instructions to cause a computer system to perform the following functions: provide a business process document for expressing the business process, wherein the business process comprises a plurality of components and a workflow; provide a plurality of installation documents, where each installation document describes an installation of a component of the business process; provide a mapping document for mapping each component of the business process to at least one of the installation documents describing the installation of that component; and provision the business process on-demand using the business process document, the installation documents, and the mapping document.

BRIEF DESCRIPTION OF THE DRAWINGS

These and other features of this invention will be more readily understood from the following detailed description of the various aspects of the invention taken in conjunction with the accompanying drawings in which.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the present invention provides a method, system, and computer program product for the autonomic installation and configuration of an enterprise business process on-demand. In particular, a meta-language mapping document is used by a BPEL controller to map the components of a business process described in a BPEL document to Solution Module Definition (SMD) documents describing the installation of the individual components of the business process.

BPEL provides a model for describing simple or complex exchanges that characterize business partner interactions. BPEL is a language for specifying the behavior of business processes by web services, and as web services. In BPEL, one can use standard web services to invoke a process, and expose the resulting business process as a web service. BPEL defines the elements for controlling workflow, the result of which is a fully-executable and portable script. Because a BPEL script will run on any BPEL-compliant engine, it's platform- and vendor-neutral.

From a technical perspective, BPEL offers a standard language for defining how to send XML messages to remote services, manipulate XML data structures, receive XML messages asynchronously from remote services, manage events and exceptions, define parallel sequences of execution and undo parts of processes when exceptions occur. These are the constructs needed to compose a set of services into collaborative and transactional business processes. BPEL is based on Extensible Markup Language (XML) schema, Simple Object Access Protocol (SOAP) and Web Service Description Language (WSDL). The specification for BPEL for Web Services (BPEL4WS), Version 1.1, is incorporated herein by reference in its entirety.

An SMD document describes the installation of a software solution. A solution can be a basic product such as a database or a complicated product such as WEBSPHERE, available from International Business Machines, Inc., of Armonk, N.Y., that requires a database, a queue manager, and various other pre-requisite products installs. For example, if a business process requires an order processing web service and a shipping web service, the provisioning of the individual web services will be described in corresponding SMD documents. The two SMDs will be used to provision the two web services, which will subsequently be configured to work together. The BPEL document corresponding to the business process describes how the processing and shipping web services work together. Additional information regarding SMDs can be found, for example, in the Installable Unit Deployment Descriptor Specification Version 1.0, incorporated herein by reference in its entirety.

It is assumed for the purposes of this description that the reader has an understanding of BPEL, SMDs, web services, and XML. Accordingly, a detailed description of these topics is not provided herein.

Figure 1:
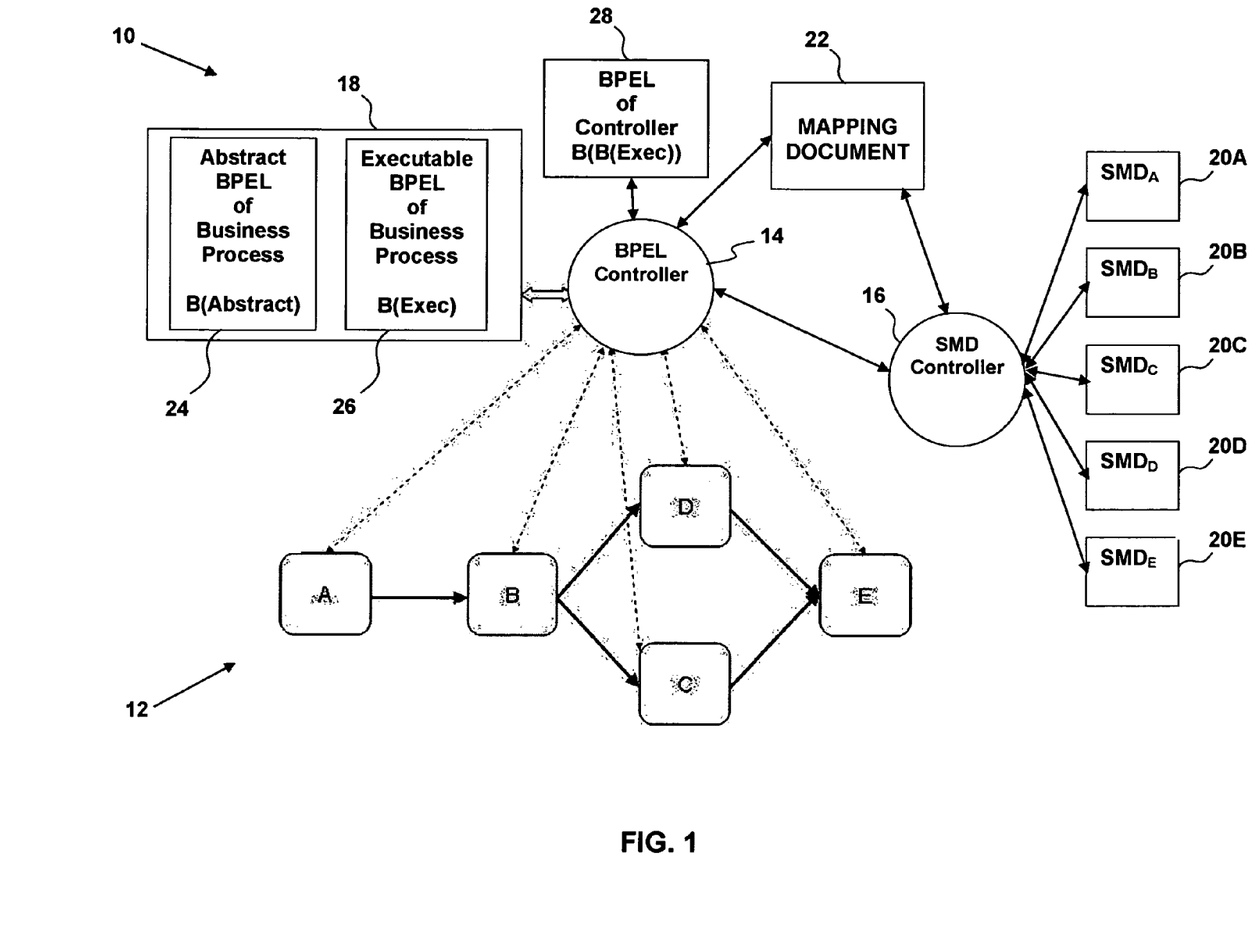
FIG. 1 depicts a system for the autonomic installation and configuration of an enterprise business process on-demand in accordance with an embodiment of the present invention.

A system 10 for the autonomic installation and configuration of an enterprise business process 12 on-demand in accordance with an embodiment of the present invention is illustrated in FIG. 1. In this example, the business process 12 comprises components A, B, C, D, and E, which comprise web services located on the same or different servers. In the business process 12, it can be seen that the output of component A is provided as an input to component B, the output of component B is provided as an input to components C and D, and the outputs of components C and D are provided as inputs to component E. As an example, component A may comprise a shopping cart for collecting products to be purchased from a web site on the Internet. Component B may comprise an ordering service for placing an order for the products specified in the shopping cart. Components C and D may comprise a credit service for authorizing a credit card number for the purchase of the products and an inventory service for determining whether the products are available in inventory, respectively. Finally, component E may comprise an order completion service for completing/denying the purchase of the products, based on the outputs of the credit service and the inventory service. It will be appreciated by one skilled in the art that business process 12 is illustrative only and is not intended to be limiting, and that many other types of business processes can be implemented using the concepts of the present invention.

System 10 includes a BPEL controller 14 and an SMD controller 16 for provisioning the business process 12 based on: a BPEL document 18 that describes the workflow and components (A, B, C, D, E) of the business process 12; SMD documents 20 (20A, 20B, 20C, 20D, 20E) corresponding to the individual components specified in the BPEL document 18; and an XML-based meta-language mapping document 22 for mapping each component specified in the BPEL document 18 to at least one corresponding SMD document 20 and policy. The BPEL controller 14 understands both BPEL and the meta-language of the meta-language mapping document 22. The BPEL controller 14 is in charge of the overall provisioning of the business process 12 and for connecting the components of the business process 12 on demand, based on the BPEL document 18 and the meta-language mapping document 22. The SMD controller 16 controls the overall provisioning of the individual SMD documents 20.

As set forth in the BPEL specification, the BPEL document 18 includes an abstract BPEL document B(Abstract) 24 that describes the business process 12 in abstract form for the outside world, and an executable BPEL document B(Exec) 26 that describes the executable business process containing the components A, B, C, D, and E and its workflow. In accordance with the present invention, the BPEL controller 14 is provided with an additional BPEL document B(B(Exec)) 28 that describes the BPEL process followed by the BPEL controller 14 to control the B(Exec) process.

The following assumptions are made in accordance with the present invention: (1) all components involved are web services; (2) all web services support the BPEL infrastructure; (3) the web services have a method to report events to the BPEL controller 14; (4) events such as failure to contact a web service downstream or degradation of performance are candidates for reporting; (5) the BPEL controller 14 has a "null RPC" like message to test the existence of individual services (e.g., null(A) for service A); (6) the BPEL controller 14 is a web service capable of responding to events. The event response of the BPEL controller 14 can be described with a <pick> BPEL construct with "createInstance=true"; and (7) the SMD controller 16 is a web service that is called from the BPEL controller 14 service.

The <pick> activity awaits the occurrence of one of a set of events and then performs the activity associated with the event that occurred. The occurrence of the events is often mutually exclusive. The selection of the activity depends upon whichever event occurs first. A special form of <pick> is used when the creation of an instance of the business process could occur as a result of receiving one of a set of possible messages. In this case, the <pick> itself has a createInstance attribute with a value of yes. In this case, the events in the <pick> must all be inbound messages and each of those is equivalent to a receive with the attribute "createInstance=yes." The variable assigned to this operation can be a mapping info between the porttype and the SMD document for that particular sub-system or <activity> creation. The idea is to dynamically enable new processes into the business processes without any downtime. As such, as soon as this modification is published the BPEL controller detects the change and after the instantiation of the sub-system all messages are required to flow through the sub-system without complex downtime and startup scenarios. The <pick> activity has the following form:

```
<pick createInstance="yes|no"? standard-attributes>
    standard-elements
    <onMessage partnerLink="ncname" portType="qname"
        operation="ncname" variable="ncname"?>+
    <correlations>?
```

-continued

```
        <correlation set="ncname" initiate="yes|no"?>+
    </correlations>
    activity
</onMessage>
<onAlarm (for="duration-expr" | until="deadline-expr")>*
    activity
</onAlarm>
</pick>
```

Additional information regarding the <pick> activity can be found in the above-referenced BPEL specification.

The system 10 of the present invention requires intelligence to map or correlate the components of the BPEL document 18 to the SMD documents 20 present in the system. The meta-language mapping document 22 provides this intelligence. The meta-language mapping document 22 comprises a document written in an XML-based meta-language. The following is an example of a meta-language mapping document 22:

```
<Mapping-doc>
<global-policy-constraints>
    <!-- This section describes SMDs/CIU and SIU that are mutually
    incompatible.
    This knowledge is used by the optimizer/scheduler to construct an
    optimized and conflict free schedule.
    -->
    <!-- do not put any un-related machine on my subnet -->
    <!-- exclusive access to my database instance -->
</global-policy-constraints>
<bpel_smd-map bpel_document="xpointer_bpel_doc">
    <map-element name="me1" binding="bnd1">
        <smd location="xpointer_smd1" />
        <policy-constraints>
            <!-- sla metrics and constraints
                min_memory=
                min_processor=
                cpu_usage=
                min_transactions=      -->
            <!-- any conflicts or other constraints -->
        </policy-constraints>
    </map-element>
    <map-element name="me2" port="port1">
        <smd location="xpointer_smd1" />
        <policy-constraints>
            <!-- sla metric and constraints -->
            <!-- any conflicts or other constraints
                incompatible_components="oracle,db2"
                                                        -->
        </policy-constraints>
    </map-element>
</bpel_smd-map>
</Mapping-doc>
```

Figure 2:
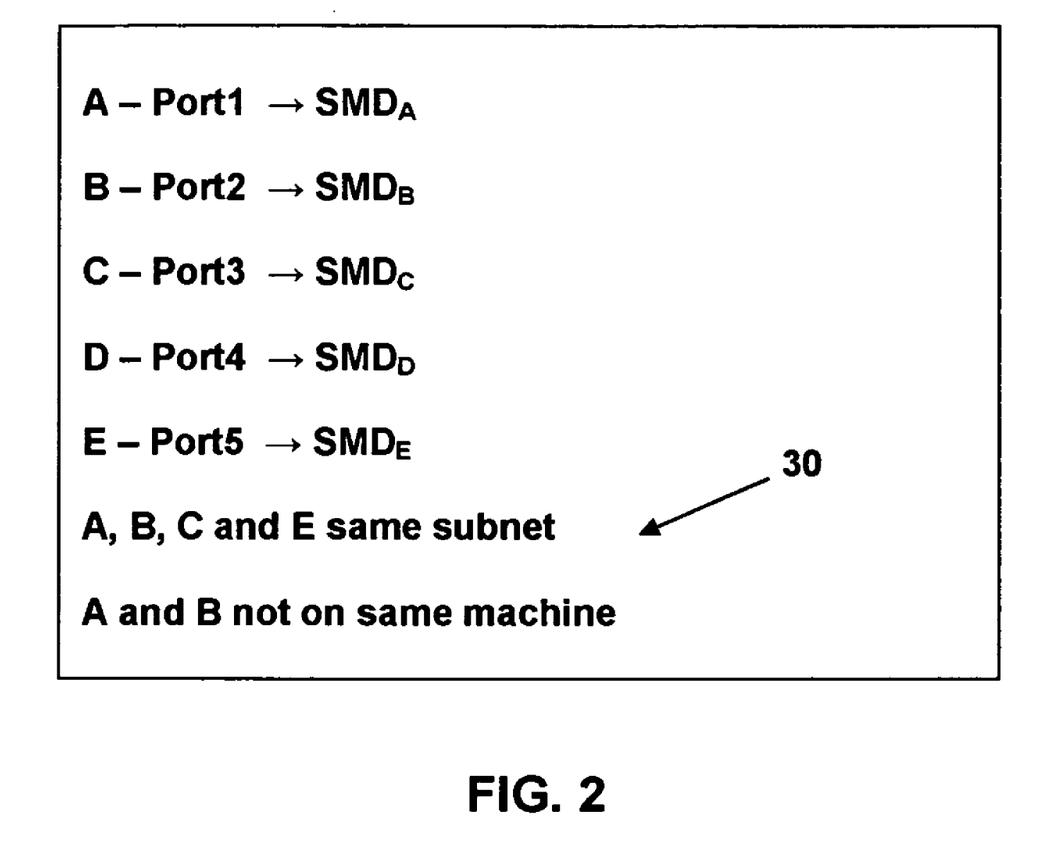
FIG. 2 depicts an example of the mapping and policy constraints provided by a meta-language mapping document in accordance with the present invention.

As shown, the meta-language mapping document 22 maps a WSDL port or binding referenced in the BPEL document 18 to an SMD document 20 that provisions that WSDL port or binding. The meta-language mapping document 22 also associates other information such as service level agreement (SLA) guarantees and metrics with this mapping. In the <policy-constraints> sections, the meta-language mapping document 22 describes mutually incompatible SMD installations and other policy constraints. The <global-policy-constraints> section describes policy information that applies to the entire meta-language mapping document 22. An example of the mapping and policy constraints provided by the meta-language mapping document 22, using the business process 12 shown in FIG. 1, is illustrated in FIG. 2. In this example, Port1 is mapped to $SMD_A$ for component A of business process 12 by the meta-language mapping document 22. Likewise, Port2 is mapped to $SMD_B$, Port3 is mapped to $SMD_C$, Port4 is mapped to $SMD_D$, and Port5 is mapped to $SMD_E$, for components B, C, D, and E, respectively, of business process 12. Also shown are the policy constraints 30 set forth by the meta-language mapping document 22.

It should be noted that the mapping provided by the mapping document 22 does not have to be 1:1 as in the above example. For instance, the provisioning of a component of a business process may require a plurality of SMD documents. As an example, a component X may comprise an application server such as WEBSPHERE, available from International Business Machines, Inc. and an application such as DB2 provided by the application server. To this extent, the mapping document 22 would provide the necessary mappings required to provision the multiple SMD documents required by component X.

Figure 3:
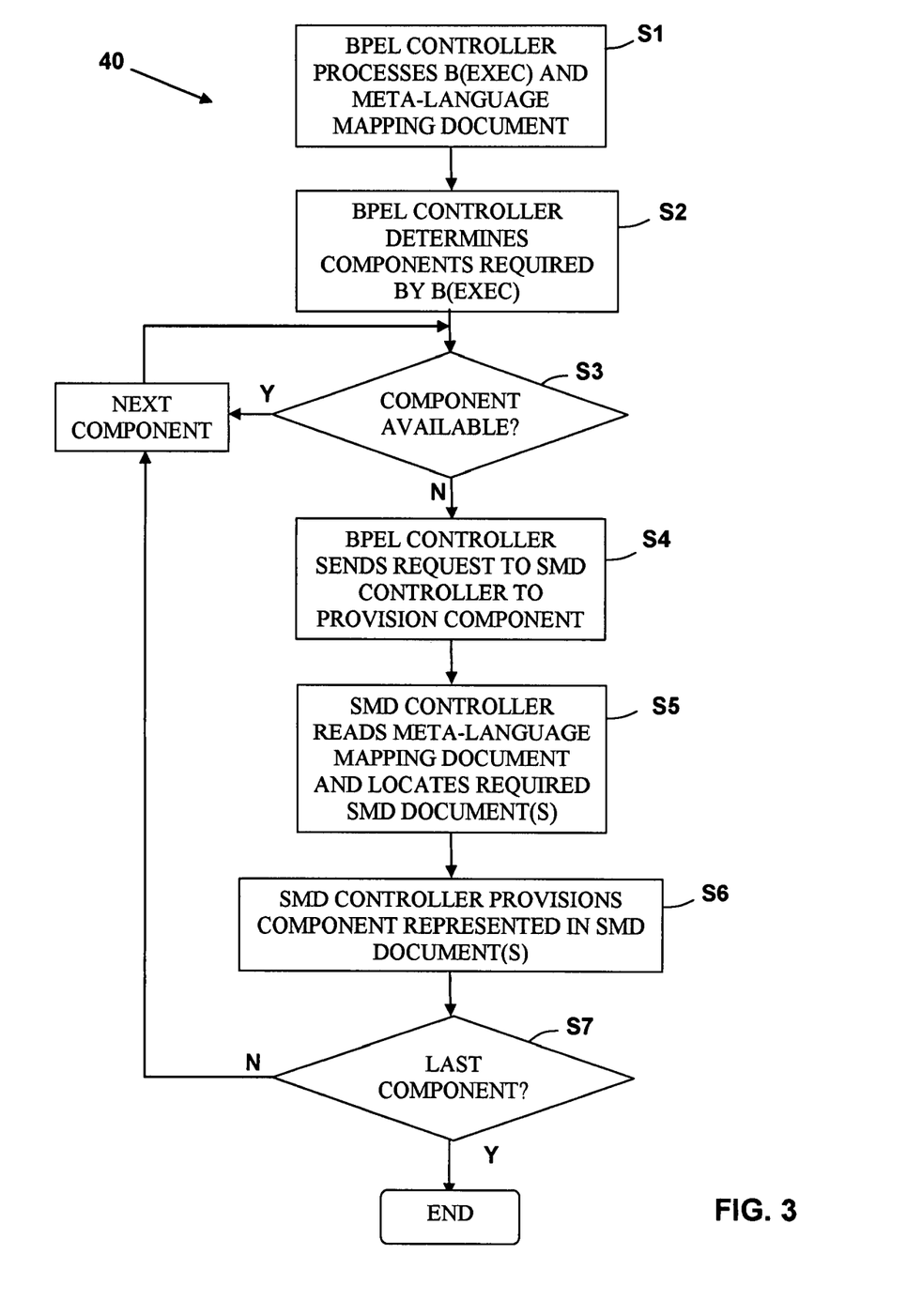
FIG. 3 depicts a flow diagram illustrating a method for provisioning a business process in accordance with an embodiment of the present invention.

A flow diagram 40 illustrating a method for provisioning a business process in accordance with an embodiment of the present invention is illustrated in FIG. 3. The method will be described below in terms of the provisioning of the business process 12 comprising components (i.e., web services) A, B, C, D, and E shown in FIG. 1.

In step S1 of the flow diagram 40, the BPEL controller 14 processes the executable BPEL document B(Exec) 26 and the meta-language mapping document 22 corresponding to the business process 12. In step S2, the BPEL controller 14 determines the components (A, B, C, D, E) required by the executable BPEL document B(Exec) 26 for the business process 12. In step S3, the BPEL controller 14 determines if the first component (component A) required by the executable BPEL document B(Exec) 26 is available. This can be done, for example, by sending a null(A) message to the component A. If the component A is available, step S3 is repeated for the next component (component B) required by the executable BPEL document B(Exec) 26. If component A is not available, null(A) fails and generates a ServiceNotFound(A) event. In step S4, the BPEL controller 14 uses <pick> ServiceNotFound (A) with "createInstance=true" and sends a request to the SMD controller 16 to provision component A. Parameters for the message are: a pointer to the meta-language mapping document 22; and component A. In step S5, the SMD controller 16 reads the meta-language mapping reference 22 and locates the SMD document(s) 20 corresponding to component A. In step S6, the SMD controller 16 provisions the SMD document(s) corresponding to component A. This process is repeated (step S7) to provision each additional component required by the executable BPEL document B(Exec) 26 for the business process 12. During this process, the BPEL controller 14 also modifies the BPEL document B(Exec) to connect each component of the business process 12 together in the proper order. For example, if component A is provisioned at computer X and component B is provisioned at computer Y, then the BPEL controller 14 modifies the executable BPEL document B(Exec) 26 such that computer X knows where to locate computer Y to provide the correct workflow A→B for the business process 12.

In accordance with the present invention, the business process 12 can be installed on-demand in a server environment simply by deploying a BPEL controller 14 and providing the BPEL controller 14 with the executable BPEL document B(Exec) 26, SMD documents 20, and the mapping document 22. The BPEL controller 14 will then function as described above to provision the components and workflow of the business process 12.

Figure 4:
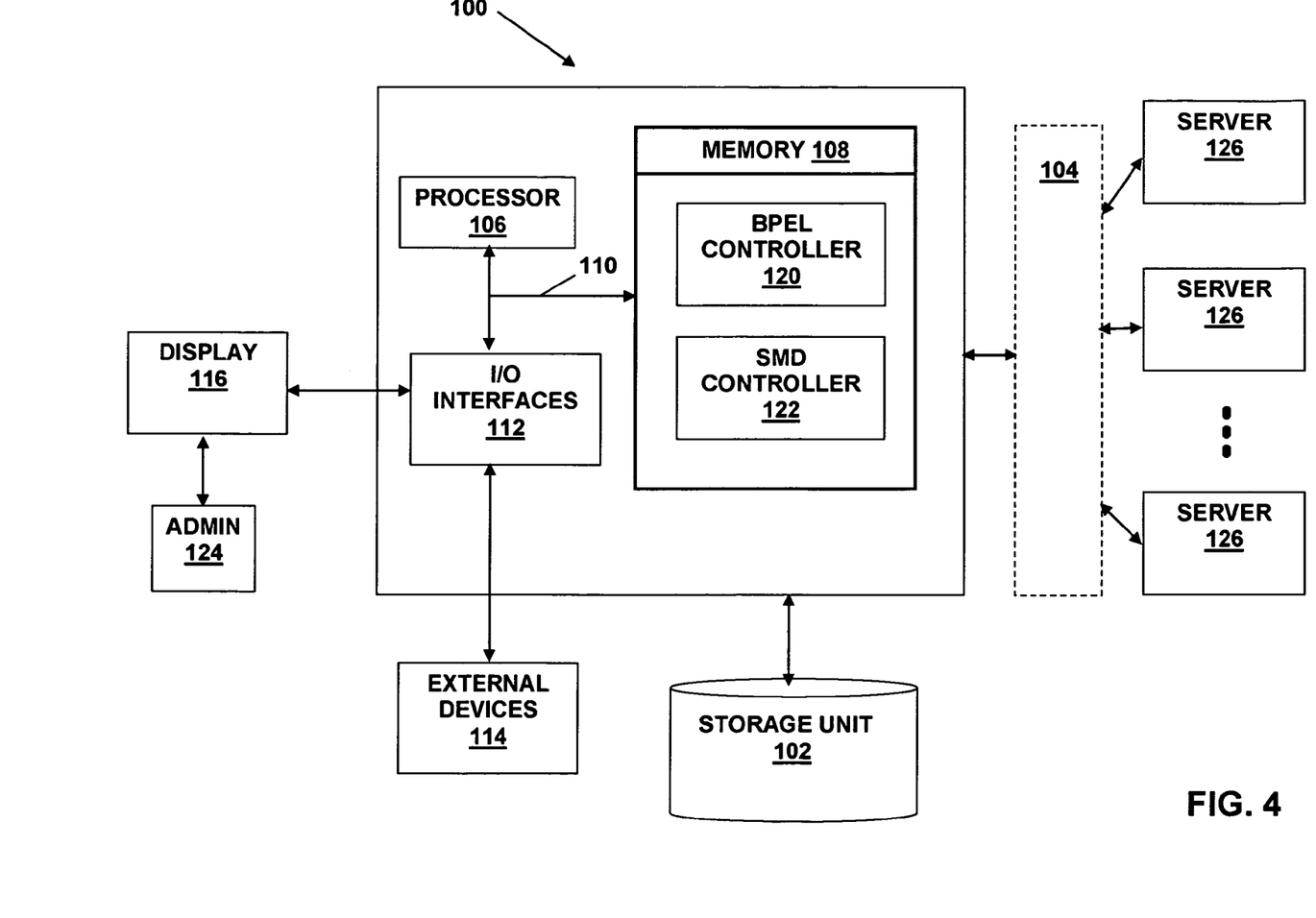
FIG. 4 depicts a computer system for implementing the present invention.

Referring now to FIG. 4, there is illustrated a computer system 100 for the autonomic installation and configuration of an enterprise business process on-demand in accordance with the present invention. Computer system 100 is intended to represent any type of computerized system capable of implementing the methods of the present invention. For example, computer system 100 may comprise a desktop computer, laptop computer, workstation, server, hand-held device, pager, etc.

The BPEL documents 24, 26, 28, SMD documents 20, and the mapping document 22 can be stored locally to computer system 100, for example, in storage unit 102, and/or may be provided to computer system 100 over a network 104. Storage unit 102 can be any system capable of providing storage for data and information under the present invention. As such, storage unit 102 may reside at a single physical location, comprising one or more types of data storage, or may be distributed across a plurality of physical systems in various forms. In another embodiment, storage unit 102 may be distributed across, for example, a local area network (LAN), wide area network (WAN) or a storage area network (SAN) (not shown). Network 104 is intended to represent any type of network over which data can be transmitted. For example, network 104 can include the Internet, a wide area network (WAN), a local area network (LAN), a virtual private network (VPN), a WiFi network, or other type of network. To this extent, communication can occur via a direct hardwired connection or via an addressable connection in a client-server (or server-server) environment that may utilize any combination of wireline and/or wireless transmission methods. In the case of the latter, the server and client may utilize conventional network connectivity, such as Token Ring, Ethernet, WiFi or other conventional communications standards. Where the client communicates with the server via the Internet, connectivity could be provided by conventional TCP/IP sockets-based protocol. In this instance, the client would utilize an Internet service provider to establish connectivity to the server.

As shown, computer system 100 generally includes a processor 106, memory 108, bus 110, input/output (I/O) interfaces 112 and external devices/resources 114. Processor 106 may comprise a single processing unit, or may be distributed across one or more processing units in one or more locations, e.g., on a client and server. Memory 108 may comprise any known type of data storage and/or transmission media, including magnetic media, optical media, random access memory (RAM), read-only memory (ROM), etc. Moreover, similar to processor 106, memory 108 may reside at a single physical location, comprising one or more types of data storage, or be distributed across a plurality of physical systems in various forms.

I/O interfaces 112 may comprise any system for exchanging information to/from an external source. External devices/resources 114 may comprise any known type of external device, including speakers, a CRT, LED screen, handheld device, keyboard, mouse, voice recognition system, speech output system, printer, monitor/display (e.g., display 116), facsimile, pager, etc.

Bus 110 provides a communication link between each of the components in computer system 100, and likewise may comprise any known type of transmission link, including electrical, optical, wireless, etc. In addition, although not shown, other components, such as cache memory, communication systems, system software, etc., may be incorporated into computer system 100.

Shown in memory 108 is BPEL controller 120 and SMD controller 122, which may be provided as computer program products. The BPEL controller 120 and SMD controller 122 are configured to autonomically install and configure an enterprise business process on-demand using BPEL documents 24, 26, 28, SMD documents 20, and mapping document 22 stored, for example, in storage unit 102. The business process can be installed (e.g., by an administrator 124) on a server environment comprising computer system 100 and/or servers 126 coupled to computer system 100 via network 104.

It should be appreciated that the teachings of the present invention could be offered as a business method on a subscription or fee basis. For example, computer system 100 could be created, maintained, supported, and/or deployed by a service provider that offers the functions described herein for customers. That is, a service provider could be used to autonomically install and configure an enterprise business process on-demand, as describe above. It should also be understood that the present invention can be realized in hardware, software, a propagated signal, or any combination thereof. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product or a propagated signal, which comprises all the respective features enabling the implementation of the methods described herein, and which—when loaded in a computer system—is able to carry out these methods. Computer program, propagated signal, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

We claim:

1. A method for installing and configuring an enterprise business process on-demand, comprising:

providing a Business Process Execution Language (BPEL) document to a computer system, the BPEL document for expressing the enterprise business process, wherein the enterprise business process comprises a plurality of components and a workflow, and wherein each component of the enterprise business process expressed in the BPEL document comprises a web service;

providing a plurality of Solution Module Definition (SMD) documents to the computer system, wherein each SMD document describes an installation of a component of the enterprise business process, the component comprising a software solution of a web service;

mapping each component of the enterprise business process expressed in the BPEL document to at least one of the plurality of SMD documents describing the installation of that component using a meta-language mapping document provided to the computer system wherein the meta-language mapping document correlates a Web Service Description Language (WSDL) binding or port with each SMD document and provides at least one policy constraint; and provisioning the enterprise business process on-demand on the computer system using the BPEL document, the plurality of SMD documents, and the meta-language mapping document, the enterprise business process on-demand provisioning comprising: determining if each component of the enterprise business process is available, and for each component of the enterprise business process that is not available, reading the meta-language mapping document to locate the component, provisioning the located component, and updating the BPEL document to provide an updated workflow for the enterprise business process.

2. The method of claim 1, further comprising:
providing a BPEL controller for provisioning the business process based on the BPEL document, the plurality of SMD documents, and the mapping document.

3. The method of claim 2, further comprising:
providing an SMD controller for provisioning the plurality of SMD documents upon request of the BPEL controller.

4. The method of claim 3, wherein the BPEL controller and SMD controller comprise web services.

5. A system for installing and configuring an enterprise business process on-demand, comprising:

a Business Process Execution Language (BPEL) document for expressing the enterprise business process, wherein the enterprise business process comprises a plurality of components and a workflow, and wherein each component of the enterprise business process expressed in the BPEL document comprises a web service;

a plurality of Solution Module Definition (SMD) documents, wherein each SMD document describes an installation of a component of the enterprise business process, the component comprising a software solution of a web service;

a meta-language mapping document for mapping each component of the enterprise business process expressed in the BPEL document to at least one of the plurality of SMD documents describing the installation of that component, wherein the meta-language mapping document correlates a Web Service Description Language (WSDL) binding or port with each SMD document and provides at least one policy constraint; and a computer system for provisioning the enterprise business process on-demand using the BPEL document, the plurality of SMD documents, and the meta-language mapping document, the enterprise business process on-demand provisioning comprising: determining if each component of the enterprise business process is available, and for each component of the enterprise business process that is not available, reading the meta-language mapping document to locate the component, provisioning the located component, and updating the BPEL document to provide an updated workflow for the enterprise business process.

6. The system of claim 5, further comprising:
a BPEL controller for provisioning the business process based on the BPEL document, the plurality of SMD documents, and the mapping document.

7. The system of claim 6, further comprising:
an SMD controller for provisioning the plurality of SMD documents upon request of the BPEL controller.

8. The system of claim 7, wherein the BPEL controller and SMD controller comprise web services.

9. A program product stored on a recordable device for installing and configuring an enterprise business process on-demand, which when executed by a computer system comprises:
- program code for providing a Business Process Execution Language (BPEL) document for expressing the enterprise business process, wherein the enterprise business process comprises a plurality of components and a workflow, and wherein each component of the enterprise business process expressed in the BPEL document comprises a web service;
- program code for providing a plurality of Solution Module Definition (SMD) documents, wherein each SMD document describes an installation of a component of the rise business process, the component comprising a software solution of a web service;
- program code for mapping each component of the enterprise business process expressed in the BPEL document to at least one of the plurality of SMD documents describing the installation of that component using a meta-language mapping document, wherein the meta-language mapping document correlates a Web Service Description Language (WSDL) binding or port with each SMD document and provides at least one policy constraint; and
- program code for provisioning the enterprise business process on-demand using the BPEL document, the plurality of SMD documents, and the meta-language mapping document, the enterprise business process on-demand provisioning comprising: determining if each component of the enterprise business process is available, and for each component of the enterprise business process that is not available, reading the meta-language mapping document to locate the component, provisioning the located component, and updating the BPEL document to provide an updated workflow for the enterprise business process.

10. The program product of claim 9, further comprising:
program code for providing a BPEL controller for provisioning the business process based on the BPEL document, the plurality of SMD documents, and the mapping document.

11. The program product of claim 10, further comprising:
program code for providing an SMD controller for provisioning the plurality of SMD documents upon request of the BPEL controller.

12. The program product of claim 11, wherein the BPEL controller and SMD controller comprise web services.

* * * * *